(12) United States Patent
Maeda

(10) Patent No.: US 6,590,991 B1
(45) Date of Patent: Jul. 8, 2003

(54) SOUND-VIBRATION GENERATOR

(75) Inventor: Mitsuhiko Maeda, Takatsuki (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/743,101
(22) PCT Filed: Jul. 5, 1999
(86) PCT No.: PCT/JP99/03635
§ 371 (c)(1), (2), (4) Date: Jan. 5, 2001
(87) PCT Pub. No.: WO00/02303
PCT Pub. Date: Jan. 13, 2000

(30) Foreign Application Priority Data

Jul. 6, 1998 (JP) .......................... 10-190768
Jul. 6, 1998 (JP) .......................... 10-190769
Jul. 6, 1998 (JP) .......................... 10-190770

(51) Int. Cl.[7] .................................... H04R 25/00
(52) U.S. Cl. .................. 381/409; 381/396; 381/410
(58) Field of Search ........................ 381/396, 151, 381/409, 410, FOR 152, 400; 340/388.1, 391.1; 310/30, 81

(56) References Cited

U.S. PATENT DOCUMENTS 5,721,785 A * 2/1998 Imahori .................. 381/396
5,956,622 A * 9/1999 Lee ....................... 381/396
6,229,903 B1 * 5/2001 Kobayashi ............... 381/409
6,404,085 B2 * 6/2002 Hamaguche et al. ....... 381/396

FOREIGN PATENT DOCUMENTS

| JP | 60-112166 | 7/1985 |
| JP | 05-072184 | 9/1993 |
| JP | 05-085192 | 11/1993 |
| JP | 06-126577 | 5/1994 |
| JP | 07-059322 | 3/1995 |
| JP | 07-020081 | 4/1995 |
| JP | 09-172763 | 6/1997 |
| JP | 10-174408 | 6/1998 |

* cited by examiner

*Primary Examiner*—Huyen Le
(74) *Attorney, Agent, or Firm*—Armstrong, Westerman & Hattori, LLP

(57) ABSTRACT

A sound-vibration generating device includes as arranged in a main body case a sound generating unit and a vibration generating unit. The main body case has attached to a bottom portion thereof a bottom plate to be soldered to a land on a printed wiring board, and is provided at an end portion thereof with a pair of connecting terminals for receiving a drive signal for driving the sound generating unit and/or the vibration generating unit. The connecting terminals are provided at lower ends thereof with joint portions to be soldered to respective lands on the printed wiring board. The rear surface of the bottom plate and the rear faces of the joint portions of the terminals are positioned on the same plane or approximately the same plane to thereby render the sound-vibration generating device mountable on the surface of the board.

9 Claims, 8 Drawing Sheets

SOUND-VIBRATION GENERATOR

BACKGROUND OF THE INVENTION

1. Field of the Invention

The present invention relates to sound-vibration generating devices to be incorporated into portable communications devices such as portable telephones and pagers, or small devices such as wristwatches and toys.

2. Description of the Related Art

Conventional portable telephones have incorporated therein a sound generator (ringer) for notifying the user of incoming calls with sound, and a vibration generator for notifying the user of incoming calls by vibrating the body of the telephone. One of the two generators is selectively usable according to the situation.

However, a sufficient space is not available in small devices such as portable telephones for accommodating both the sound generator and the vibration generator, and the provision of these two generators entails the problem of making the device larger.

Accordingly, the present inventor has proposed a compact sound-vibration generating device having the functions of both the sound generator and the vibration generator as shown in FIGS. 13 and 14 (JP-A No. 14194/1998).

The sound-vibration generating device includes two vibration systems housed in a resin casing 110. The casing 110 includes a lower case 110a for supporting a first vibration system, and an upper case 110b for supporting a second vibration system. The upper case 110b has a sound release aperture 111 formed in its central portion.

The first vibration system includes a first diaphragm 112 having a plurality of swirling slits, and a first vibrator 116 having a permanent magnet 113. The first vibrator 116 is attached by adhesion to the inner peripheral portion of the first diaphragm 112, the outer peripheral portion of which is attached to the lower case 110a by adhesion. The first vibration system can therefore be vibrated up and down relative to the lower case 110a. The first vibrator 116 includes an upper yoke 114 and a lower yoke 115 which are arranged respectively on the upper and lower sides of the permanent magnet 113, whereby a magnetic circuit is provided. The magnet 113 is magnetized such that the upper side thereof provides an N pole, with the lower side thereof serving as an S pole. The upper yoke 114 is in the form of a ring having an inner periphery formed by a vertical wall, while the lower yoke 115 is in the form of a disk having a central protrusion. A magnetic gap 121 is formed between the vertical wall of the upper yoke 114 and the central protrusion of the lower yoke 115 for making a second vibrator 117 movable up and down.

On the other hand, the second vibration system includes a second diaphragm 122, and the second vibrator 117 which has a coil 118. The second diaphragm 122 has an inner peripheral portion having the second vibrator 117 attached thereto by adhesion and an outer peripheral portion attached to the upper case 110b by adhesion, whereby the second vibration system is made vibratable vertically relative to the upper case 110b. The coil 118 of the second vibrator 117 is supported by a hollow cylindrical bobbin 119 on the rear side of the second diaphragm 122. The coil 118 and the bobbin 119 are arranged such as to be movable in the magnetic gap 121 of the first vibrator 116.

The second vibration system has a natural frequency (for example, of about 2 kHz) in the audible range, while the first vibration system has a lower natural frequency (for example, of about 100 Hz) than the second vibration system. Accordingly, the second vibration system can be resonated to produce sound by connecting a drive circuit (not shown) to a pair of free ends 123, 123 of the coil 118 and feeding to the coil 118 a drive signal having the natural frequency of the second vibration system. On the other hand, the first vibration system can be resonated to produce a vibration perceivable by the human body by feeding to the coil 118 a drive signal having the natural frequency of the first vibration system.

A study is under way on a method of mounting the sound-vibration generating device on a printed wiring board by inserting a pair of terminal pins through an end portion of the casing 110 axially of the casing, attaching the pins to the end portion, connecting the pair of free ends of the coil 118 to the upper ends of the respective terminal pins, inserting the lower ends of the terminal pins through holes in the wiring board to position the sound-vibration generating device in place, and soldering the pin lower ends to the rear surface of the wiring board for electrical connection, i.e., a mounting method by dipping.

However, the mounting method by dipping permits the lower ends of the terminal pins and the solder joints to project from the rear surface of the printed wiring board, resulting in an increased thickness for the assembly of printed wiring board and an increased size for the device, such as a portable telephone, in which the generating device is to be incorporated.

Moreover, dipping involves the necessity of performing the step of solder reflow separately from the assembly step of installing the sound-vibration generating device on the printed wiring board, resulting in an increased manufacturing cost.

Accordingly, a first object of the present invention is to provide a sound-vibration generating device which is adapted for surface mounting to thereby overcome all the foregoing problems.

In the case where the conventional sound-vibration generating device is to be incorporated into small devices such as portable telephones, there is a need to fix the rear surface of the casing 110 to the surface of a printed wiring board or the like, whereas because the first vibration system is especially great in mass of vibration to produce a great vibrating force through resonance, sufficient rigidity is required of the casing 110, especially of the lower case 110a serving as the support portion. Furthermore, the adhesive joint between the outer peripheral portion of the first diaphragm 112 and the lower case 110a which is subjected directly to the force of vibration requires a sufficient adhesion strength to receive the force of vibration.

The conventional sound-vibration generating device nevertheless suffers from the problem that an effective construction is not always utilized for providing sufficient rigidity to the lower case 110a and imparting a satisfactory adhesion strength to the adhesive joint between the outer peripheral portion of the first diaphragm 112 and the lower case 110a.

Accordingly, a second object of the present invention is to provide a sound-vibration generating device the body of which is supportable with sufficient rigidity and which has satisfactory strength against vibrating force produced by vibration.

The diaphragm 112 of the first vibration system has a spring structure provided with a plurality of swirling slits to produce a great amplitude, so that when subjected to an impact, for example, after falling, the first vibration system becomes excessively displaced, not only permitting the excessive displacement to cause damage to the diaphragm itself but also allowing the upper yoke 114 or lower yoke 115 to come into direct contact with the diaphragm 122 of the second vibration system to possibly cause damage also to the second diaphragm 122. Because the diaphragms 112, 122 are relatively low in strength, there arises the problem that the sound-vibration generating device fails to operate normally.

Accordingly, a third object of the present invention is to provide a sound-vibration generating device in which the diaphragm or like component is unlikely to be damaged even if subjected to an impact.

SUMMARY OF THE INVENTION

The present invention provides a first sound-vibration generating device which includes as arranged in a main body case 10 a sound generating unit 9 for producing sound toward the outside of the main body case 10, and a vibration generating unit 6 for vibrating the main body case 10.

The main body case 10 has attached to a bottom portion thereof a bottom plate 12 to be soldered to a land on a printed wiring board, the main body case 10 being provided at an end portion thereof with a pair of connecting terminals 13, 14 for receiving a drive signal for driving the sound generating unit 9 and/or the vibration generating unit 6, the connecting terminals 13, 14 being provided at lower ends thereof with joint portions 13a, 14a to be soldered to respective lands on the printed wiring board, a rear surface of the bottom plate 12 and rear faces of the joint portions 13a, 14a of the terminals 13, 14 being positioned on the same plane or approximately the same plane.

Stated more specifically, the vibration generating unit 6 includes a magnet assembly attached to the main body case 10 by a first diaphragm 1, and the sound generating unit 9 includes a coil 7 attached to the main body case 10 by a second diaphragm 8, the magnet assembly having a magnetic gap for accommodating therein the coil 7 of the sound generating unit 9, the coil 7 having a pair of free ends 7b, 7b connected to the pair of connecting terminals 13, 14.

The surface of the printed wiring board 21 on which the sound-vibration generating device of the present invention is to be installed has a land for joining the base plate 12 thereto by soldering, and lands for joining the joint portions 13a, 14b of the pair of terminals 13, 14 thereto by soldering. The lands are covered with a solder paste applied thereto. The sound-vibration generating device of the invention is placed in position on the surface of the printed wiring board 21.

Because the rear surface of the bottom plate 12 is positioned on the same plane or approximately the same plane as the rear faces of the joint portions 13a, 14a of the pair of connecting terminals 13, 14, these joint portions are brought into intimate contact with the lands on the wiring board 21. In this state, the board is subjected to a reflow treatment, whereby the bottom plate 12 and the pair of terminals 13, 14 are soldered to the respective lands on the board.

The bottom plate 12 is soldered to the land on the wiring board 21 in this way, whereby the sound-vibration generating device is firmly secured to the printed wiring board, and the pair of connecting terminals 13, 14 are soldered to the corresponding lands on the board 21 to thereby connect the device to the board electrically.

The first diaphragm 1 in the specific construction is in the form of a disk and secured to the main body case 10 with an outer peripheral portion 1e thereof held between the main body case 10 and the bottom plate 12.

This construction permits the bottom plate 12 to serve also as the member for securing the first diaphragm 1 to the main body case 10, whereby the number of components can be reduced.

The main body case 10 is in the form of a hollow cylinder, and the pair of connecting terminals 13, 14 extend through a holder 10i provided on an outer peripheral portion of the main body case 10 and are attached to the main body case 10.

Because the main body case 10 is cylindrical in this construction, a dead space is invariably formed on the printed wiring board 21, whereas the holder 10i and the pair of terminals 13, 14 are arranged in the dead space. This assures effective use of the dead space, further permitting use of a board of smaller size.

Each of the connecting terminals 13, 14 includes a strip-like terminal body 13b extending in the direction of extension of the terminal through the holder 10i and provided on opposite sides thereof with wedge portions 13c, 13d projecting in directions orthogonal to the direction of extension.

With this specific construction, the terminals 13, 14 are inserted through the holder 10i for assembly, permitting the wedge portions 13c, 13d to bite in the holder 10i to produce a wedge effect, with the result that the terminals 13, 14 can be reliably held to the holder 10i without the ready likelihood of shifting.

Each of the connecting terminals 13, 14 is provided at an upper end portion thereof with a winding portion 13e for connecting the free end 7b of the coil 7 thereto, whereby the free ends 7b, 7b of the coil 7 can be easily and reliably connected to the respective terminals 13, 14, which themselves are effectively prevented from slipping off.

The rear faces of the joint portions 13a, 14a of the connecting terminals 13, 14 slightly project toward the printed wiring board beyond the rear surface of the bottom plate 12. Accordingly, when a reflow treatment is conducted with the sound-vibration generating device placed on the printed wiring board and with the bottom plate 12 and the joint portions 13a, 14a of the pair of terminals 13, 14 pressed against respective solder paste layers for surface mounting, the joint portions 13a, 14a of the terminals 13, 14 are joined to the lands on the wiring bond under high pressure to realize reliable electrical connection.

Because the first sound-vibration generating device of the present invention can be mounted on the surface of the printed wiring board as described above, the portable telephone or like device in which the generating device is to be incorporated can be made more compact. Moreover, there is no need to separate the solder reflow step from the step of placing the sound-vibration generating device on the printed wiring board to result in a manufacturing cost reduction.

The present invention provides a second sound-vibration generating device having a casing including a main body case 10 in the form of a hollow cylinder and a bottom plate 12 in the form of a disk and attached to an opening portion of the main body case 10, the casing having arranged therein a sound generating unit 9 for producing sound toward the outside of the casing and a vibration generating unit 6 for vibrating the casing.

A diaphragm 1 constituting the vibration generating unit 6 is secured to the main body case 10 with an outer peripheral portion 1e thereof held between the main body case 10 and the bottom plate 12.

The bottom plate 12 is made from a metal plate and includes a circular traylike body and a flange 12i projecting from an outer periphery of the body radially thereof, the outer peripheral portion 1e of the diaphragm 1 being held between the flange 12i of the bottom plate 12 and a face of the main body case 10 opposed to the flange.

With the sound-vibration generating device of the present invention, the bottom plate 12 includes a traylike body and a flange 12i projecting therefrom and is so shaped in section as to have high rigidity, so that the device body including the main body case 10, sound generating unit 9 and vibration generating unit 6 can be supported with sufficient rigidity by the bottom plate 12 as secured to the surface of the printed wiring board.

Furthermore, the flange 12i formed on the bottom plate 12 affords an increased area of contact for holding the diaphragm 1 between the bottom plate and the main body case 10, with the result that the diaphragm 1 can be firmly held between the flange 12i and the face of the case 10 opposed thereto. This affords a sufficient strength to receive a great force of vibration that would be produced by the generation of vibration.

Stated more specifically, the traylike body of the bottom plate 12 comprises a disk portion 12g, and a cylindrical portion 12h projecting from an outer peripheral edge of the disk portion axially thereof, the flange 12i projecting from an axial end of the cylindrical portion 12h.

An outer peripheral end face 12a of the flange 12i is fitted in an inner periphery 10c of the main body case 10 in pressing contact therewith and adhered thereto, whereby the bottom plate 12 is secured to the main body case 10.

Consequently, the bottom plate 12, even if having a small thickness, can be secured to the main body case 10 with the highest possible strength.

An annular clearance 12d is formed between an outer periphery 12c of the cylindrical portion 12h of the bottom plate 12 and an inner periphery 10e of the main body case 10 and filled with an adhesive.

This specific construction enables the adhesive to secure the bottom plate 12 to the main body case with a still higher bond strength.

Further according to the specific construction of the invention, the bottom plate 12 has a material and a shape so as to be joined by soldering to a land on a printed wiring board, the main body case 10 being provided at an end portion thereof with a pair of connecting terminals 13, 14 for receiving a drive signal for driving the sound generating unit 9 and/or the vibration generating unit 6, the connecting terminals 13, 14 being provided at lower ends thereof with joint portions 13a, 14a to be soldered to respective lands on the printed wiring board, a rear surface of the bottom plate 12 and rear faces of the joint portions 13a, 14a of the terminals 13, 14 being positioned on the same plane or approximately the same plane.

When the sound-vibration generating device having this specific construction is to be mounted on the surface of the printed wiring board, a land is formed on the wiring board for joining the base plate 12 thereto by soldering, with lands also formed thereon for joining the pair of terminals 13, 14 thereto by soldering. The lands are covered with a solder paste applied thereto.

Because the rear surface of the bottom plate 12 is positioned on the same plane or approximately the same plane as the rear faces of the joint portions 13a, 14a of the pair of connecting terminals 13, 14, these rear faces are brought into intimate contact with the lands on the wiring board 21. In this state, the board is subjected to a reflow treatment, whereby the bottom plate 12 and the pair of terminals 13, 14 are soldered to the respective lands on the board.

The bottom plate 12 is soldered to the land on the wiring board 21 in this way, whereby the sound-vibration generating device is firmly secured to the printed wiring board, and the pair of connecting terminals 13, 14 are soldered to the corresponding lands on the board 21 to thereby connect the device to the board electrically.

According to the second sound-vibration generating device of the present invention, the sectional shape of the bottom plate including a traylike body and a flange projecting therefrom enables the bottom plate to support the device body with sufficient rigidity, also affording a sufficient strength against the force of vibration produced by the generation of vibration as described above.

The present invention provides a third sound-vibration generating device including as arranged in a casing a sound generating unit 9 for producing sound toward the outside of the casing, and a vibration generating unit 6 for vibrating the casing, wherein the casing is provided with a stopper for limiting the shift of the vibration generating unit 6.

Stated more specifically, the vibration generating unit 6 includes a magnet assembly attached to a main body case 10 by a first diaphragm 1, and the sound generating unit 9 includes a coil 7 attached to the main body case 10 by a second diaphragm 8, the magnet assembly having a magnetic gap for accommodating therein the coil 7 of the sound generating unit 9.

When the vibration generating unit 6 is about to be shifted greatly by an impact acting on the sound-vibration generating device of the invention, the unit 6 comes into contact with the stopper in the course of shifting to limit the shift.

This not only eliminates the likelihood that the first diaphragm 1 itself of the vibration generating unit 1 will be damaged by an excessive shift but also prevents the magnet assembly from colliding directly with the second diaphragm 8, whereby the second diaphragm 8 is also protected against damage. Further because the end face 7c of the coil 7 is prevented from colliding with the bottom surface 2b of the lower yoke 2, the coil 7 is unlikely to become damaged.

Stated more specifically, the stopper includes an upper stopper 10h and a lower stopper 12f with which the magnet assembly of the vibration generating unit 6 comes into contact. This assures safety with respect to either direction of shifting.

The upper stopper 10h is formed on an inner peripheral surface of the main body case 10, and the lower stopper 12f is formed on a surface of a bottom plate 12. This specific construction will not add to the number of components because the two stoppers 10h, 12f can be provided integrally with the respective main body case 10 and bottom plate 12.

Even when the third sound-vibration generating device of the invention is subjected to an impact, for example, upon falling, the excessive shifting of the vibration generating unit 6 is limited to obviate the likelihood of the diaphragm 1 or 8, the coil 7 or like component becoming damaged as described above.

DETAILED DESCRIPTION OF THE PREFERRED EMBODIMENT

With reference to the drawings, the present invention will be described in detail as embodied into a sound-vibration generating device for use in portable telephones for notifying the user of incoming calls.

Figure 1:
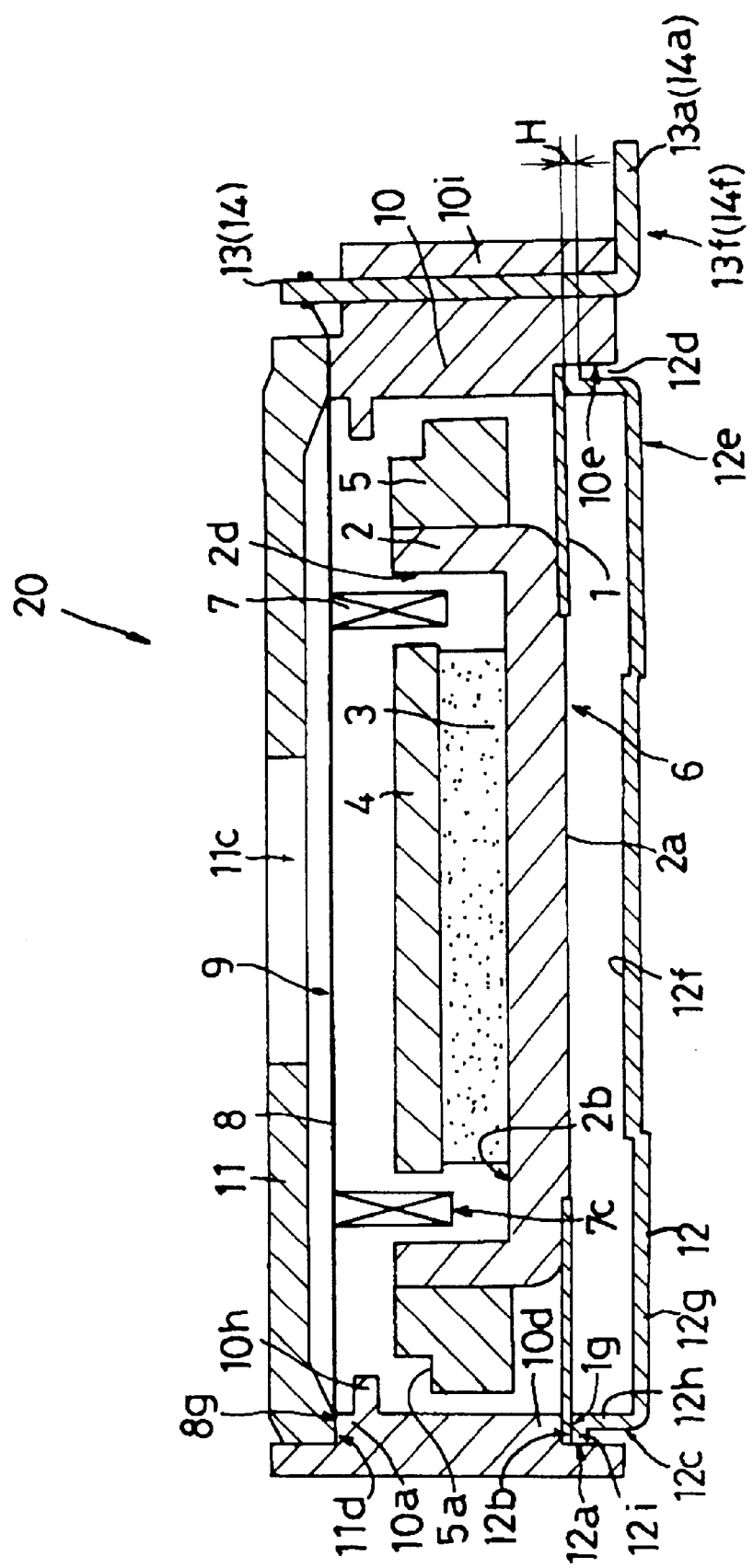
FIG. 1 is a view in section of a sound-vibration generating device according to the present invention.

As shown in FIG. 1, the present embodiment, i.e., sound-vibration generating device 20, has a flat casing which comprises a resin main body case 10 in the form of a hollow cylinder and opened at its opposite ends, a disklike resin cover 11 attached to an upper opening portion of the main body case 10, and a disklike metal bottom plate 12 attached to the lower opening portion of the main body case 10. Arranged in the housing are a sound generating unit 9 having a natural frequency (for example, of 2.5 kHz) in the audible range and drivable at the natural frequency for producing sound waves, and a vibration generating unit 6 having a natural frequency (for example, of 130 Hz) lower than that of the sound generating unit 9 and drivable at the natural frequency for vibrating the casing.

The main body case 10 is integrally provided at an end portion thereof with a holder 10i, to which a pair of connecting terminals 13, 14 are attached for receiving drive signals for driving the sound generating unit 9 and/or the vibration generating unit 6.

The construction of the sound-vibration generating device 20 will be described in greater detail along with the process for assembling the device.

Figure 2:
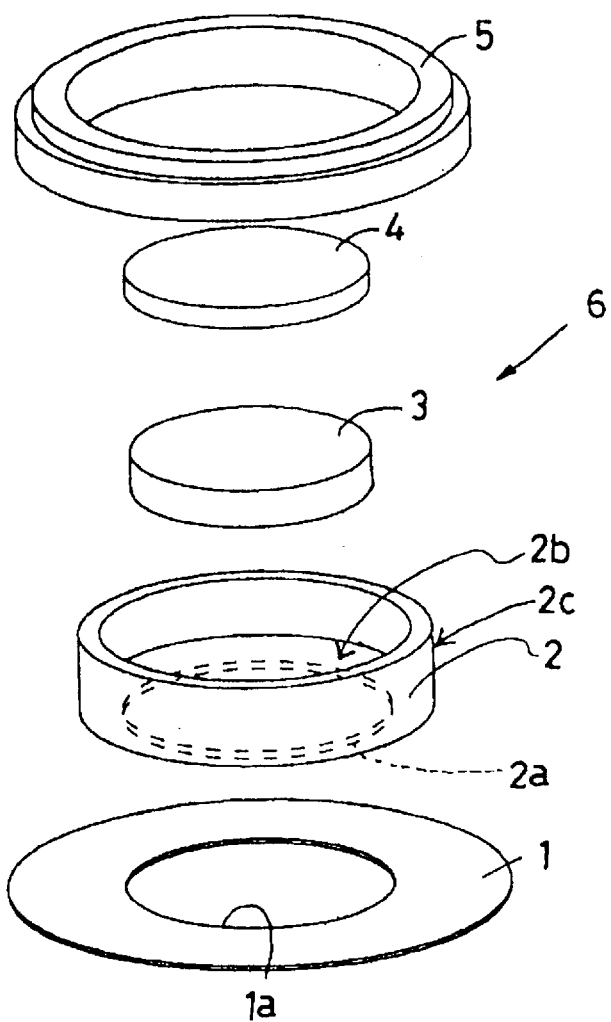
FIG. 2 is an exploded perspective view of a vibration generating unit.

With reference to FIG. 2 showing the construction of the vibration generating unit 6, a lower yoke 2 of pure iron is fixedly adhered to a first diaphragm 1 in the form of a ring concentrically therewith. The lower yoke 2 is accurately positioned in place by fitting a protrusion 2a on the rear surface of the yoke 2 into the central opening 1a of the first diaphragm 1.

Next, a magnet 3 in the form of a disk and provided by axial single-pole magnetization is fixed to a bottom surface 2b of the lower yoke 2 concentrically therewith. The magnet 3 can be fixed solely by the attraction thereof, and can be positioned concentrically using a jig (not shown).

An upper yoke 4 made of pure iron and in the form of a disk is further positioned on the upper surface of the magnet 3 concentrically therewith similarly using the jig and fixed in place by the attraction of the magnet 3.

Finally, an annular weight 5 made of a material, such as tungsten, having a great specific gravity is fitted around and fixedly adhered to the outer periphery 2c of the lower yoke 2. The adhesive to be used is an acrylic anaerobic adhesive which is curable with ultraviolet rays and heat. This adhesive is suitable from the viewpoint of amenability to assembly, and heat resistance to withstand the heat of reflow soldering.

In this way, the vibration generating unit 6 is constructed.

Figure 3:
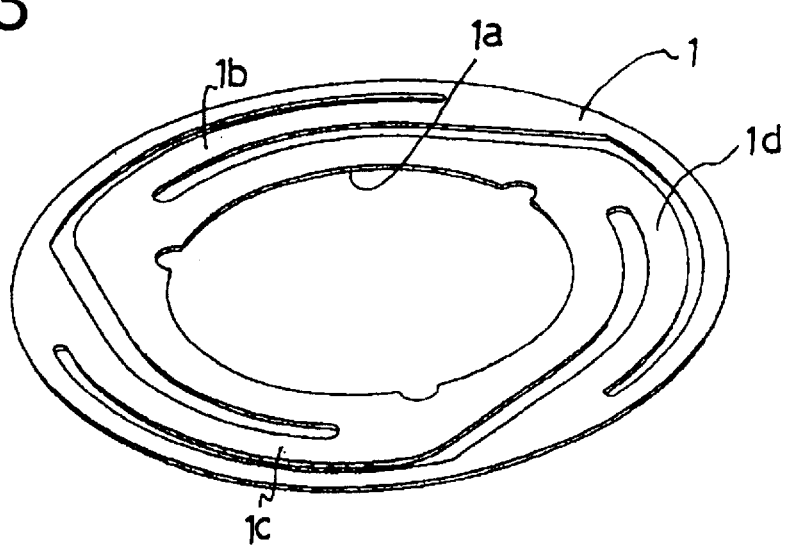
FIG. 3 is a perspective view of a diaphragm.

Incidentally, the first diaphragm 1 is a plate spring made of stainless steel and measuring about 14 mm in outside diameter and about 0.12 mm in thickness. As shown in FIG. 3, the spring has three swirling spring portions 1b, 1c, 1d having a width of about 3 mm and surrounding the central opening 1a which is about 8 mm in diameter and in which the protrusion 2a of the lower yoke 2 is fittable.

Figure 4:
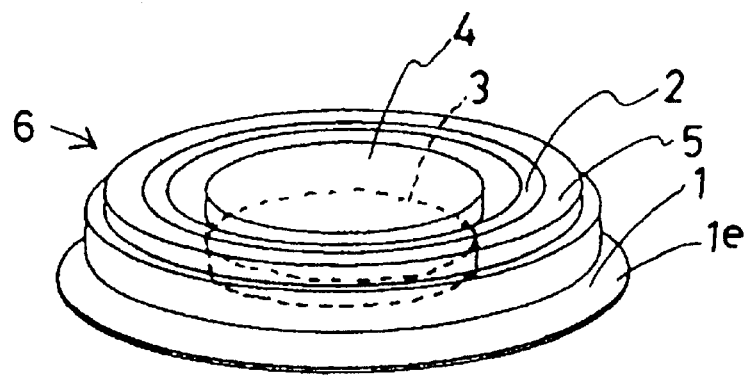
FIG. 4 is a perspective view of the vibration generating unit as assembled.

As shown in FIG. 4, accordingly, the outer peripheral portion 1e at which the first diaphragm 1 is to be held to the main body case 10 serves as the fixed end, and the lower yoke 2, magnet 3, upper yoke 4 and weight 5 are united into a magnet assembly which is to vibrate axially thereof.

Figure 5:
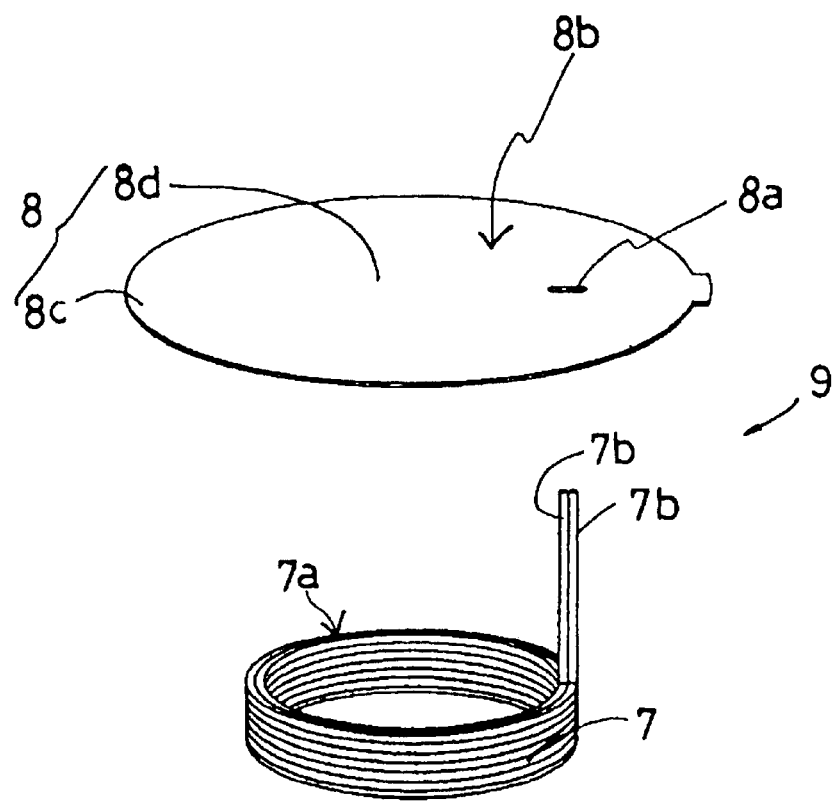
FIG. 5 is an exploded perspective view of a sound generating unit.

FIG. 5 shows the construction of the sound generating unit 9. A coil 7 in the form of a hollow cylinder has one end face 7a, on which a second diaphragm 8 is positioned concentrically therewith by means of a jig (not shown) and to which the diaphragm is secured by adhesion. The coil 7 has a pair of free ends 7b, 7b extending through a slit 8a formed in the second diaphragm 8 and having their extremities projected beyond the surface of the diaphragm 8.

Incidentally, the second diaphragm 8 is a plate spring made of stainless steel and measuring about 14 mm in diameter and about 0.04 mm in thickness, and has an outer peripheral portion 8c to be held between the main body case 10 and the cover 11 and serving as a fixed end to permit axial vibration of its central portion 8d.

Figure 6:
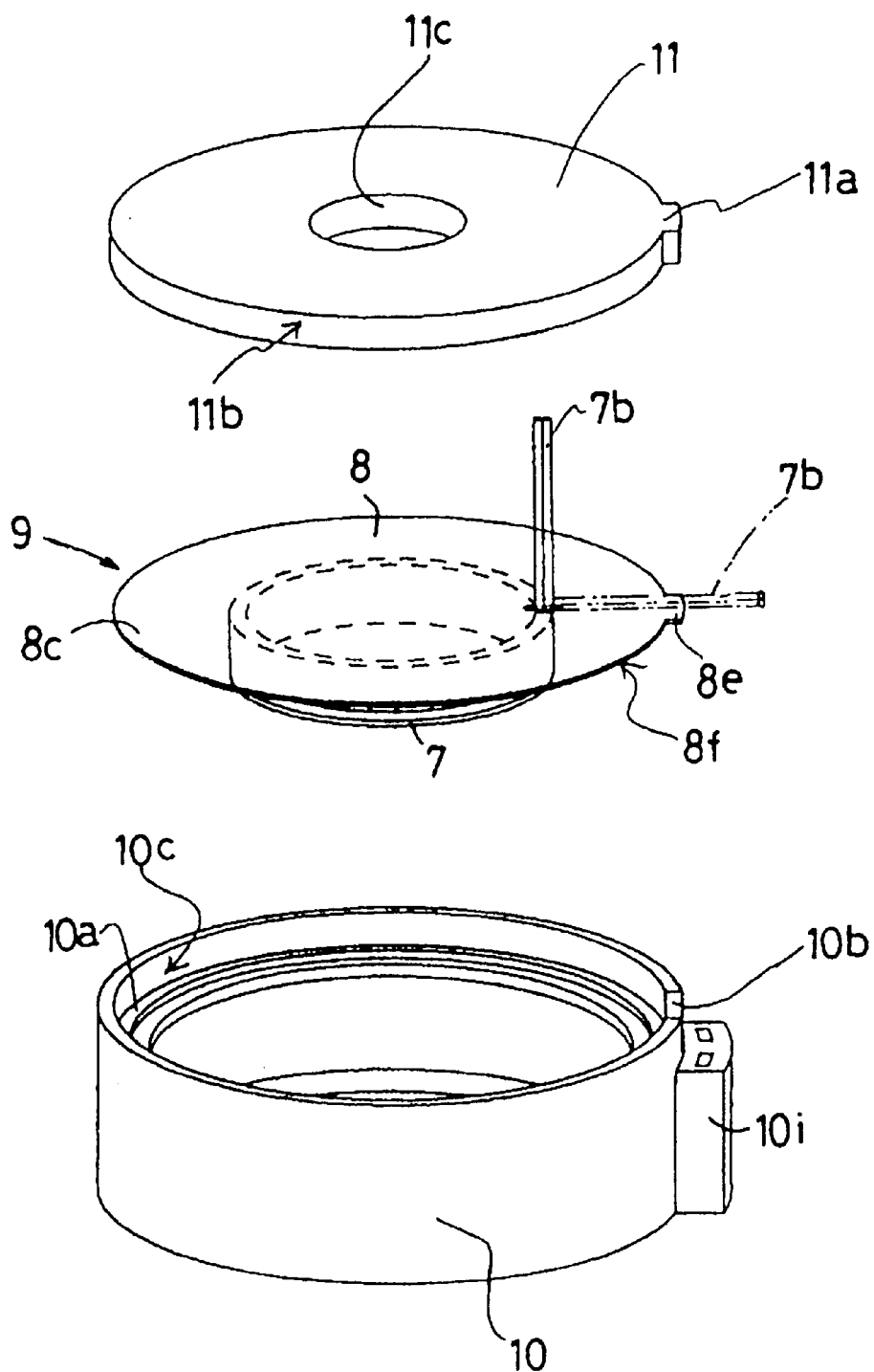
FIG. 6 is a perspective view of a structure for attaching the sound generating unit to a main body case.

The sound generating unit 9 is attached to the main body case 10 by the structure to be described next with reference to FIG. 6.

The main body case 10 is made from a heat-resistant resin, such as PPS or LCP, capable of withstanding the temperature of reflow. Such a resin is less amenable to adhesion than metals, so that a curing promoting agent is applied to the case 10 in advance.

The second diaphragm 8 has its outer peripheral portion 8c held in face-to-face contact with, and secured by adhesion to, an inner peripheral stepped portion 10a of the main body case 10. The second diaphragm 8 has a lug 8e fitting in a cutout 10b of the case, is thereby positioned in place circumferentially thereof, further has an outer periphery 8f fitting to the inner periphery 10c of the case 10 and is thereby positioned concentrically with the case 10. As indicated in chain lines, the free ends 7b, 7b of the coil 7 are bent toward the cutout 10b of the main body case 10.

The cover 11, which is made from PPS, LCP or like resin, is thereafter secured to the main body case 10 to cover the upper surface of the second diaphragm 8. The cover 11 has a projection 11a fitting in the cutout 10b of the main body case 10, is thereby positioned in place circumferentially of the cover 11, further has an outer periphery 11b fitting to the inner periphery 10c of the case 10 lightly in pressing contact therewith and is positioned concentrically with the case and secured thereto by adhesion. The adhesive is initially cured within several minutes by the action of the aforementioned curing promoting agent.

Incidentally, the cover 11 is so shaped in section as shown in FIG. 1, has a lower surface outer peripheral portion 11d in face-to-face contact with the upper surface outer peripheral portion 8g of the second diaphragm 8 and holds the outer peripheral portion of the diaphragm 8 along with the inner peripheral stepped portion 10a of the main body case 10.

The vibration generating unit 6 is attached to the main body case 10 by the structure to be described next with reference to FIG. 7.

The vibration generating unit 6 and the bottom plate 12 are attached to the main body case 10 as turned upside down and having the sound generating unit 9 installed therein. The bottom plate 12 is in the form of a thin metal plate made of nickel silver and having a thickness of about 0.2 to about 0.3 mm, and includes a disk portion 12g, a cylindrical portion 12h projecting from the outer periphery of the disk portion axially thereof, and a flange 12i projecting from an axial end of the cylindrical portion radially thereof, whereby the bottom plate 12 is given the sectional form shown in FIG. 1 and enabling the plate 12 to exhibit high rigidity. The device body including the main body case 10, the vibration generating unit 6 and the sound generating unit 9 is supported with a sufficient strength by the bottom plate as secured to a printed wiring board by soldering, as will be described later.

The first diaphragm 1 facing upward as illustrated has its outer peripheral portion 1e fixedly adhered to another inner peripheral stepped portion 10d of the main body case 10 in face-to-face contact therewith for the installation of the vibration generating unit 6. At this time, the first diaphragm 1 has its outer periphery 1f fitted to the inner periphery 10e of the case 10 lightly in pressing contact therewith and is positioned concentrically with the case. The bottom plate 12 is thereafter fixed to the lower surface (upper surface as illustrated) of the first diaphragm 1. The outer peripheral end face 12a of the flange 12i is fitted to the inner periphery 10e of the main body case 10 in light pressing contact therewith, whereby the bottom plate 12 is positioned concentrically with the case. The bottom plate is secured thereto by adhesion.

As shown in FIG. 1, the upper face 12b of the flange of the bottom plate 12 is in face-to-face contact with the rear surface outer peripheral portion 1g of the first diaphragm 1 to hold the outer peripheral portion of the diaphragm 1 between the upper face 12b and the inner peripheral stepped portion 10d of the case 10.

Incidentally, the outer periphery 12c of the bottom plate 12 is about 0.05 to about 0.2 mm smaller in radius than the flange outer periphery 12a.

The bottom plate 12 is prepared from a metal plate of very small thickness as previously stated by drawing the plate, followed by blanking. Accordingly, the plate 12 can be formed in the complicated shape shown in FIG. 1 as finished with high accuracy. Especially the flange outer periphery 12a can be finished with an accurate diameter by blanking and can therefore be fitted in with light pressure as previously stated. Further the flange can be given an increased outside diameter by the drawing work preceding the blanking, so that the flange upper face 12b for holding the first diaphragm 1 along with the main body case 10 can be finished with a high degree of flatness.

However, because the bottom plate 12 is a thin plate, the face thereof to be adhered to the inner peripheral surface of the main body case 10 is the flange outer periphery 12a shown in FIG. 1, i.e., an area having only a small width which is dependent on the thickness H of the thin plate, so that an insufficient adhesion strength is likely to result.

Accordingly, the above-mentioned acrylic anaerobic adhesive is filled into an annular clearance 12d formed between the outer periphery 12c of the bottom plate 12 and the inner periphery 10e of the main body case 10. The adhesive has a viscosity of about 500 cp and therefore affords a sufficiently high bond strength if the adhesive layer formed has a thickness of about 0.1 mm.

The adhesive filling the clearance is thereafter irradiated with ultraviolet rays in an oven and heated, whereby uncured adhesive can be cured completely.

Consequently, the bottom plate 12 is firmly secured to the main body case 10.

Further the first diaphragm 1 is held between the bottom plate 12 and the case 10 over an area of contact which is increased by forming the flange 12i, so that the first diaphragm 1 can be secured with sufficient adhesion.

Figure 8:
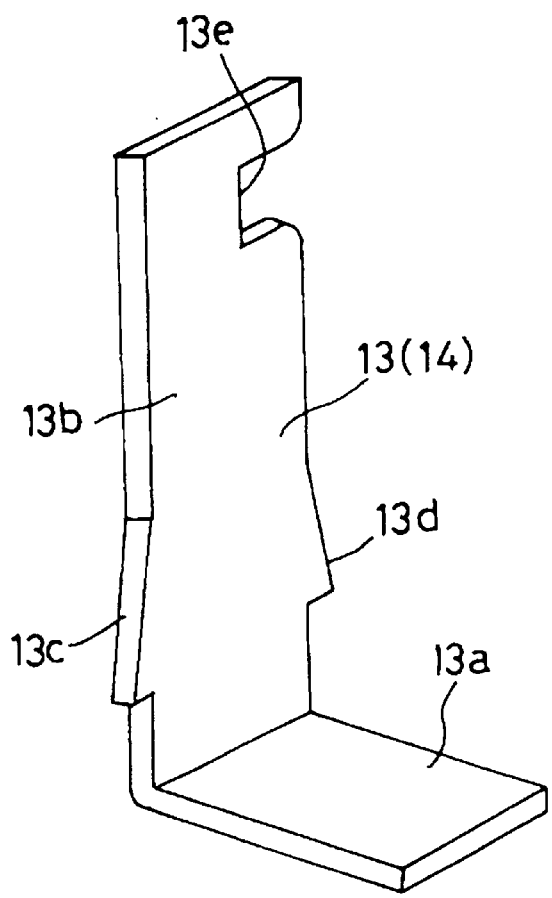
FIG. 8 is an enlarged perspective view of a connecting terminal.

Next, the pair of connecting terminals 13, 14 will be described with reference to FIG. 8.

These connecting terminals 13, 14 are made from a metal plate of nickel silver and shaped symmetrically as arranged side-by-side and have basically the same construction, so that one of the terminals, 13, only will be described.

The connecting terminal 13 comprises a terminal body 13b in the form of a strip, and a joint portion 13a formed by bending a lower end portion of the body 13b at a right angle. The rear face of the joint portion 13a is joined to a printed wiring board by reflow soldering. The terminal body 13b is provided at its upper end with a winding portion 13e for winding the coil free end therearound for connection. The terminal body 13b is provided at its opposite sides with wedge portions 13c, 13d having a height of about 0.1 mm.

Figure 7:
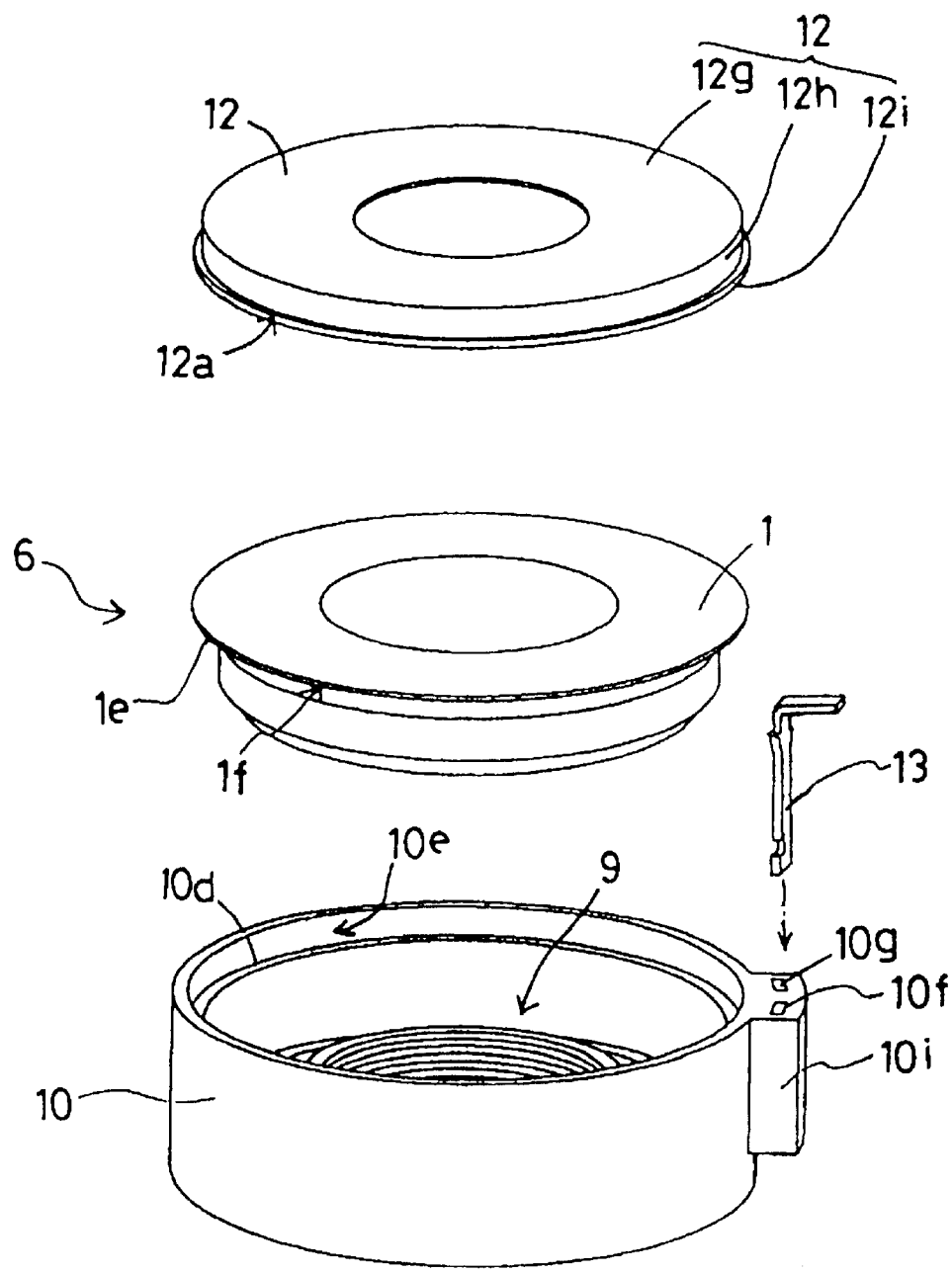
FIG. 7 is a perspective view of a structure for attaching the vibration generating unit to the main body case.

As shown in FIG. 7, on the other hand, the holder 10i is integrally formed on an outer peripheral portion of the main body case 10 for attaching the pair of connecting terminals 13, 14. FIG. 7 shows the terminal 13 only, with the other connecting terminal 14 omitted.

Figure 9:
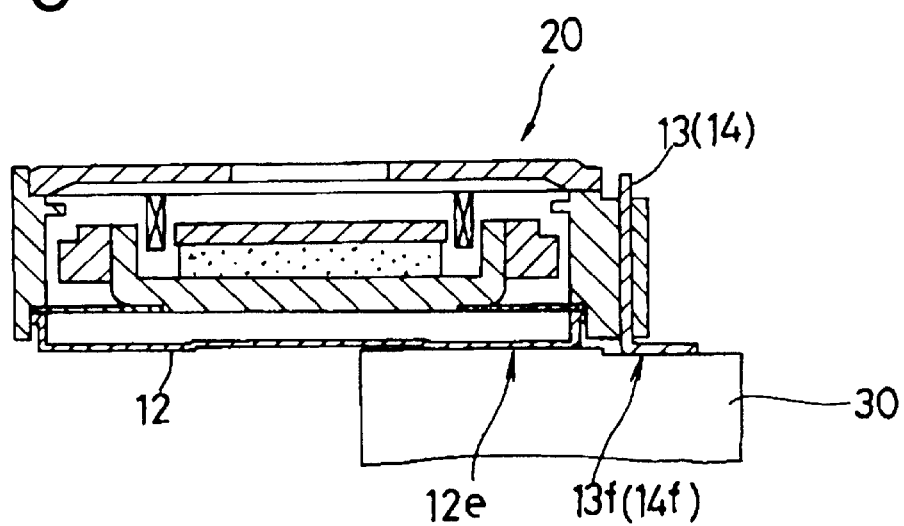
FIG. 9 is a view in section for illustrating a method of positioning the connecting terminal in place.

The holder 10i has a pair of rectangular bores 10f, 10g extending vertically therethrough, and the pair of connecting terminals 13, 14 are inserted through the respective bores 10f, 10g. At this time, using a jig 30 shown in FIG. 9, the depth of insertion of the terminals 13, 14 is so determined for positioning that the rear faces 13f, 14f of the terminals 13, 14 are about 0.05 mm lower than the rear surface 12e of the bottom plate 12. The terminals 13, 14 inserted through the holder 10i are reliably held to the holder 10i by the wedge effect of the wedge portions 13c, 13d provided on opposite sides of each terminal body 13b and will not readily shift.

Figure 10:
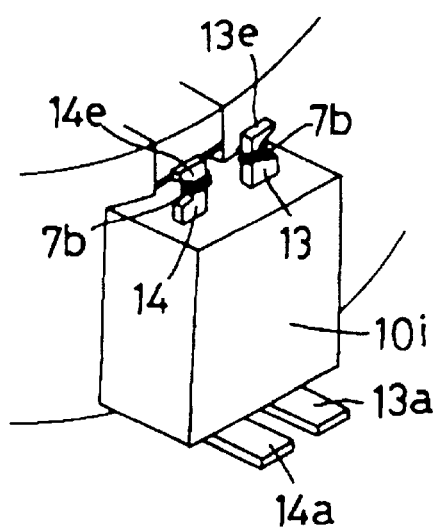
FIG. 10 is a perspective view showing free ends of a coil as wound on respective connecting terminals.

As shown in FIG. 10, the free ends 7b, 7b of the coil 7 are wound on the winding portions 13e, 14e of the pair of connecting terminals 13, 14 to thereby effect electrical connection and prevent the terminals 13, 14 from slipping off.

FIG. 1 shows the arrangement of the components of the sound-vibration generating device 20. Because the coil 7 is positioned in a magnetic gap (magnetic field) formed between the inner periphery 2d of the lower yoke 2 and the outer periphery of the upper yoke 4, alternating current passed through the coil 7 produces an axial alternating electromagnetic force. When the alternating current passed has a frequency equal to the natural frequency (about 130 Hz) of the vibration generating unit 6, the unit 6 vibrates in the axial direction, vibrating the casing to notify the user of an incoming call. Alternatively, passage of alternating current with a frequency equal to the natural frequency (about 2.5 kHz) of the sound generating unit 9 axially vibrates the sound generating unit 9, emitting sound from a sound release aperture 11c in the cover 11 for the notification of an incoming call.

Next a description will be given of a safety mechanism against the impact to be applied to the sound-vibration generating device 20 on falling.

The first diaphragm 1 has a swirling spring structure as shown in FIG. 3 for producing a great amplitude and therefore will not be sufficient in strength against impacts. With the present embodiment, accordingly, stoppers are provided respectively above and below the vibration generating unit 6 to limit the shift of the unit 6 to assure the components of safety.

Stated more specifically with reference to FIG. 1, an upper stopper 10h is formed on the inner periphery of the main body case 10 for providing an upper limit for the shift of the vibration generating unit 6.

Accordingly, when the vibration generating unit 6 is subjected to an impact and shifts upward to excess, an outer peripheral stepped portion 5a of the weight 5 comes into contact with the upper stopper 10h in the course of shifting, whereby the unit 6 is prevented from shifting further. This not only eliminates the likelihood of the first diaphragm 1 itself becoming damaged by an excessive shift but also prevents the upper yoke 4, lower yoke 2 or weight 5 from colliding directly with the second diaphragm 8 to preclude the damage to the diaphragm 8. Further because the bottom surface 2b of the lower yoke 2 is prevented from colliding with the end face 7c of the coil 7, the coil 7 is unlikely to become damaged.

A lower stopper 12f having a very small level difference is provided at the central portion of bottom of the bottom plate 12. When the vibration generating unit 6 shifts excessively downward, the protrusion 2a of the lower yoke 2 comes into contact with the lower stopper 12f in the course of shifting, whereby the unit 6 is prevented from shifting further. This obviates the likelihood that the first diaphragm 1 will be damaged by excessive shifting.

Figure 11:
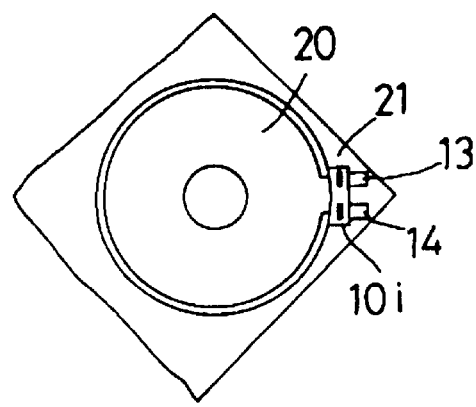
FIG. 11 is a plan view of the sound-vibration generating device as mounted on a printed wiring board.
Figure 12:
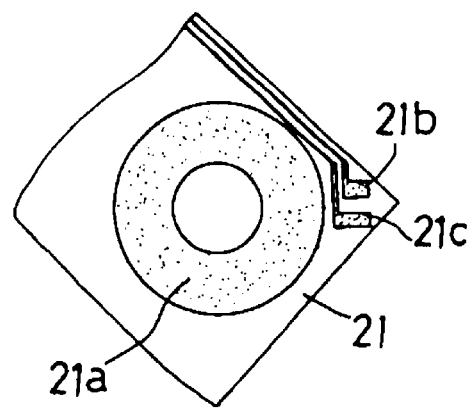
FIG. 12 is a plan view showing lands for surface-mounting the sound-vibration generating device on the printed wiring board.
Figure 13:
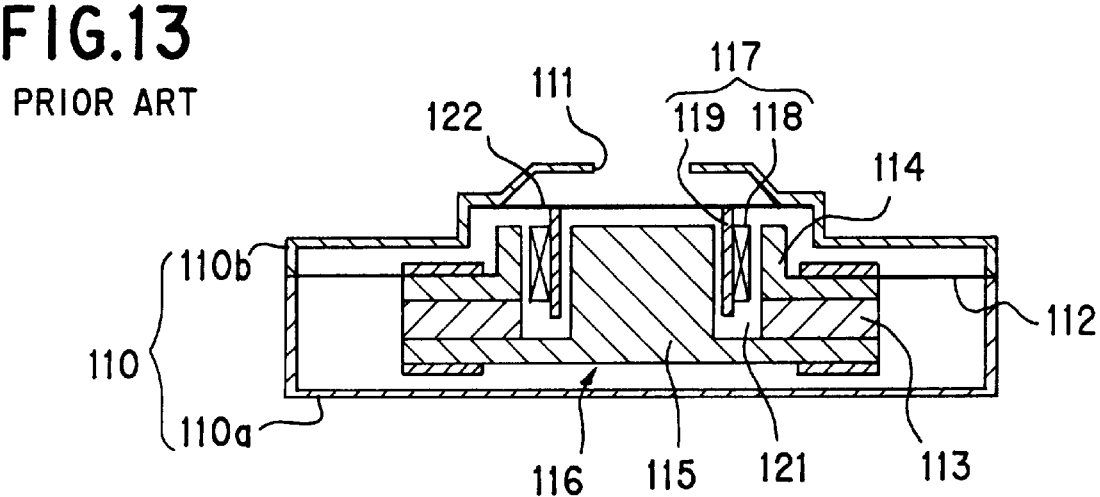
FIG. 13 is a view in section of a conventional sound-vibration generating device.
Figure 14:
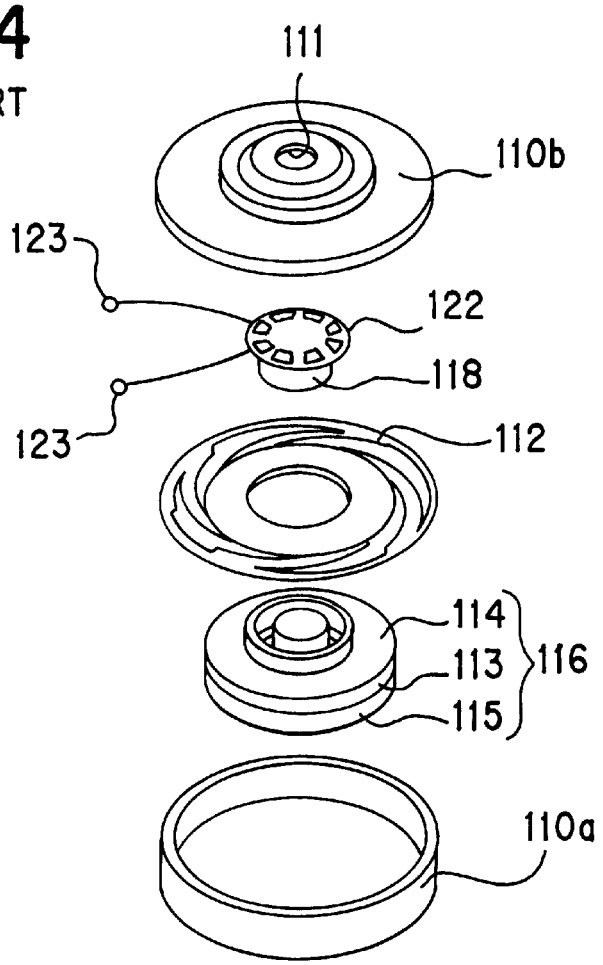
FIG. 14 is an exploded perspective view of the sound-vibration generating device.

The sound-vibration generating device 20 will be mounted on the surface of a printed wiring board in the manner to be described finally with reference to FIGS. 11 and 12.

As shown in FIG. 12, the printed wiring board 21 is provided on its surface with a land 21a for joining the bottom plate 12 of the device 20 to the board by soldering, and lands 21b, 21c for soldering the joint portions 13a, 14a of the connecting terminals 13, 14 to the board. In surface mounting, a solder paste (not shown) is applied to the lands.

The sound-vibration generating device 20 is placed on the surface of the printed wiring board 21 as shown in FIG. 11. Because the holder 10i and the pair of terminals 13, 14 can be arranged in a dead space on the board 21 as illustrated, the area of the board can be utilized effectively.

The solder paste is thereafter melted by a reflow treatment to solder the sound-vibration generating device 20 to the printed wiring board 21.

As a result, the bottom plate 12 is joined to the board 21 over a wide area corresponding to the size of the device body to secure the device 20 to the board 21 with a sufficient bond strength.

Further because the rear faces 13f, 14f of the terminals 13, 14 are positioned at a slightly lower level than the rear surface 12e of the bottom plate 12 as previously stated, the terminal rear faces 13f, 14f are firmly in intimate contact with the terminal lands 21b, 21c to realize reliable stabilized electrical connection.

Thus, the sound-vibration generating device 20 of the present invention can be mounted on the surface of the printed wiring board. This makes it possible to compact the device, such as a portable telephone, in which the present device is to be incorporated.

Further, because there is no need to form through holes in the printed wiring board 21, a compacted wiring pattern can be designed to thereby further reduce the size of the device.

The step of reflow treatment for the sound-vibration generating device 20 as placed on the printed wiring board 21 can be performed as a single step to achieve a reduction in manufacturing cost.

The bottom plate 12 utilized as a member for securing the first diaphragm 1 to the main body case 10 serves to reduce the number of components.

The holder 10i which is molded integrally with the main body case 10 for attaching the connecting terminals 13, 14 obviates the need for a holder as a separate part to reduce the number of components.

Because the upper stopper 10h and the lower stopper 12f serving as safety means are integral with the respective case 10 and bottom plate 12, the provision of the safety mechanism will not add to the number of parts.

The device of the present invention is not limited to the foregoing embodiment in construction but can be modified variously within the technical scope as set forth in the appended claims. For example, the invention is not limited only to the sound-vibration generating device for use in portable telephones for notifying the user of incoming calls, but can be applied to sound-vibration generating devices for use in small devices for the notification of time.

What is claimed is:

1. A sound-vibration generating device comprising, as arranged in a main body case:

a sound generating unit for producing sound toward the outside of the main body case; and a vibration generating unit for vibrating the main body case, wherein the main body case has attached to a bottom portion thereof a bottom plate to be soldered to a on a printed wiring board, the main body case being provided at an end portion thereof with a pair of connecting terminals for receiving a drive signal for driving the sound generating unit and/or the vibration generating unit, the connecting terminals being provided at lower ends thereof with joint portions to be soldered to respective lands on the printed wiring board, a rear surface of the bottom plate and rear faces of the joint portions of the terminals being positioned on the same plane or approximately the same plane to render the generating device mountable on a surface of the printed wiring board.

2. A sound-vibration generating device according to claim 1, wherein the vibration generating unit comprises a magnet assembly attached to the main body case by a first diaphragm, and wherein the sound generating unit comprises a coil attached to the main body case by a second diaphragm, the magnet assembly having a magnetic gap for accommodating therein the coil of the sound generating unit, the coil having a pair of free ends connected to the pair of connecting terminals.

3. A sound-vibration generating device according to claim 2, wherein the first diaphragm is in the form of a disk and secured to the main body case with an outer peripheral portion thereof held between the main body case and the bottom plate.

4. A sound-vibration generating device according to claim 2,
wherein the main body case is in the form of a hollow cylinder, and the pair of connecting terminals extends through a holder provided on an outer peripheral portion of the main body case and are attached to the main body case.

5. A sound-vibration generating device according to claim 4, wherein each of the connecting terminals comprises a striplike terminal body extending in the direction of extension of the terminal through the holder and provided on opposite sides thereof with wedge portions projecting in directions orthogonal to the direction of extension.

6. A sound-vibration generating device according to claim 2, wherein each of the connecting terminals is provided at an upper end portion thereof with a winding portion for connecting the free end of the coil thereto.

7. A sound-vibration generating device according to claim 1, wherein the rear faces of the joint portions of the connecting terminals slightly project toward the printed wiring board beyond the rear surface of the bottom plate.

8. A sound-vibration generating device having a casing, comprising:
a main body case in the form of a hollow cylinder and a bottom plate in the form of a disk and attached to an opening portion of the main body case, the casing having arranged therein a sound generating unit for producing sound toward the outside of the casing and a vibration generating unit for vibrating the casing, a diaphragm constituting the vibration generating unit and being secured to the main body case with an outer peripheral portion thereof held between the main body case with an outer peripheral portion thereof held between the main body case and the bottom plate, the sound-vibration generating device comprising the bottom plate being made from a metal plate and having a circular traylike body and a flange projecting from an outer periphery of the body radially thereof, the outer peripheral portion of the diaphragm being held between the flange of the bottom plate and a face of the main body case opposed to the flange, the traylike body of the bottom plate having a disk portion and a cylindrical portion projecting from an outer peripheral edge of the disk portion axially thereof, the flange projecting from an axial end of the cylindrical portion, an outer peripheral end face of the flange being fitted in an inner periphery of the main body case in pressing contact therewith, and an annular clearance being formed between an outer periphery of the cylindrical portion of the bottom plate and an inner periphery of the main body case and filled with an adhesive.

9. A sound-vibration generating device having a casing, comprising:
a main body case in the form of a hollow cylinder and a bottom plate in the form of a disk and attached to an opening portion of the main body case, the case having arranged therein a sound generating unit for producing sound toward the outside of the casing and a vibration generating unit for vibrating the casing, a diaphragm constituting the vibration generating unit and being secured to the main body case with an outer peripheral portion thereof held between the main body case and the bottom plate, the sound-vibration generating device comprising the bottom plate being made from a metal plate and having a circular traylike body and a flange projecting from an outer periphery portion of the diaphragm being held between the flange of the bottom plate and a face of the main body case opposed to the flange, the bottom plate having a material and a shape so as to be soldered to a land on a printed wiring board, the main body case being provided at an end portion thereof with a pair of connecting terminals for receiving a drive signal for driving the sound generating unit and/or the vibration generating unit, the connecting terminals being provided at lower ends thereof with joint portions to be soldered to respective lands on the printed wiring board, a rear surface of the bottom plate and rear faces of the joint portions of the terminals being positioned on the same plane or approximately the same plane to render the generating device mountable on a surface of the printed wiring board.

* * * * *

UNITED STATES PATENT AND TRADEMARK OFFICE
CERTIFICATE OF CORRECTION

PATENT NO.    : 6,590,991 B1
DATED         : July 8, 2003
INVENTOR(S)   : Maeda, Mitsuhiko It is certified that error appears in the above-identified patent and that said Letters Patent is hereby corrected as shown below:

<u>Column 12,</u>
Lines 34-54, should read as follows:
Claim 1:

Claim 1. A sound-vibration generating device comprising, as arranged in main body case:
    a sound generating unit for producing sound toward the outside of the main body case; and
    a vibration generating unit for vibrating the main body case,
    wherein the main body case has attached to a bottom portion thereof a bottom plate to be soldered to a <u>land</u> on a printed wiring board, the main body case being provided at an end portion thereof with a pair of connecting terminals for receiving a drive signal for driving the sound generating unit and/or the vibration generating unit, the connecting terminals being provided at lower ends thereof with joint portions to be soldered to respective lands on the printed wiring board, a rear surface of the bottom plate and rear faces of the joint portions of the terminals being positioned on the same plane or approximately the same plane to render the generating device mountable on a surface of the printed wiring board.

Signed and Sealed this

Second Day of December, 2003

JAMES E. ROGAN
*Director of the United States Patent and Trademark Office*